(12) United States Patent
Hsu et al.

(10) Patent No.: US 9,823,697 B2
(45) Date of Patent: Nov. 21, 2017

(54) ELECTRONIC DEVICE

(71) Applicant: Wistron Corporation, New Taipei (TW)

(72) Inventors: Chia-Lung Hsu, New Taipei (TW); Ming-Chih Chen, New Taipei (TW); Po-Cheng Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 115 days.

(21) Appl. No.: 14/103,863

(22) Filed: Dec. 12, 2013

(65) Prior Publication Data

US 2015/0116921 A1 Apr. 30, 2015

(30) Foreign Application Priority Data

Oct. 24, 2013 (TW) .............................. 102138525 A

(51) Int. Cl.
*G06F 1/16* (2006.01)
(52) U.S. Cl.
CPC .......... *G06F 1/1618* (2013.01); *G06F 1/1624* (2013.01); *G06F 1/1652* (2013.01)
(58) Field of Classification Search
CPC .................................................. G06F 1/1652
USPC .......... 361/679.27, 679.55, 679.56; 359/461; 455/575.4
See application file for complete search history.

(56) References Cited

U.S. PATENT DOCUMENTS

| | | | | |
|---|---|---|---|---|
| 5,353,152 A | * | 10/1994 | Realmuto | G03B 21/58 160/120 |
| 5,918,395 A | * | 7/1999 | Hesmer | G09F 11/21 40/518 |
| 5,982,537 A | * | 11/1999 | Koizumi et al. | 359/444 |
| 6,016,176 A | * | 1/2000 | Kim et al. | 349/84 |
| 6,249,377 B1 | * | 6/2001 | Takamoto et al. | 359/461 |
| 6,377,324 B1 | * | 4/2002 | Katsura | 349/58 |
| 6,498,597 B1 | * | 12/2002 | Sawano | G09F 11/29 345/107 |
| 6,729,054 B1 | * | 5/2004 | VanderTuin | 40/452 |
| 6,771,232 B2 | * | 8/2004 | Fujieda et al. | 345/30 |
| 7,180,665 B2 | * | 2/2007 | Daniel et al. | 359/461 |
| 7,184,086 B2 | * | 2/2007 | Tamura | 348/333.06 |

(Continued)

OTHER PUBLICATIONS

"Office Action of Taiwan Counterpart Application", dated Dec. 1, 2015, with English translation thereof, p. 1-p. 13.

(Continued)

*Primary Examiner* — Adrian S Wilson
(74) *Attorney, Agent, or Firm* — JCIPRNET

(57) ABSTRACT

An electronic device includes a first body, a second body, a rotary shaft and a flexible display panel. The second body is movably connected to the first body and is adapted to lean against the first body or separate from the first body. The rotary shaft is pivotally connected to the first body. The flexible display panel is connected between the first and second bodies. When the second body is at the first position, a first section of the flexible display panel is rolled around the rotary shaft, and a second section of the flexible display panel is expanded between the first and second bodies. When the second body is at the second position, a part of the first section and the second section are expanded between the first and second bodies.

16 Claims, 10 Drawing Sheets

(56) References Cited

U.S. PATENT DOCUMENTS

| | | | |
|---|---|---|---|
| 7,440,265 B2 * | 10/2008 | Ou Yang | G06F 1/1601 348/375 |
| 7,489,503 B2 * | 2/2009 | Maatta | 361/679.27 |
| 7,558,057 B1 * | 7/2009 | Naksen et al. | 361/679.56 |
| 7,787,917 B2 * | 8/2010 | Aoki et al. | 455/575.3 |
| 7,864,418 B2 * | 1/2011 | Kuroi et al. | 359/443 |
| 7,907,337 B2 * | 3/2011 | Daniel et al. | 359/461 |
| 7,952,801 B2 * | 5/2011 | Yuzawa | 359/443 |
| 7,984,746 B2 * | 7/2011 | Gao et al. | 160/370.21 |
| 8,009,421 B2 * | 8/2011 | Misawa | 361/679.55 |
| 8,467,179 B2 | 6/2013 | Probst et al. | |
| 8,605,421 B2 * | 12/2013 | Verschoor et al. | 361/679.3 |
| 8,616,354 B2 * | 12/2013 | Azirian | 190/11 |
| 8,711,566 B2 * | 4/2014 | O'Brien | 361/724 |
| 8,787,008 B2 * | 7/2014 | Walters et al. | 361/679.21 |
| 2002/0090980 A1 * | 7/2002 | Wilcox et al. | 455/566 |
| 2003/0109286 A1 * | 6/2003 | Hack et al. | 455/566 |
| 2004/0061683 A1 * | 4/2004 | Mochizuki et al. | 345/168 |
| 2005/0041012 A1 | 2/2005 | Daniel et al. | |
| 2005/0174366 A1 * | 8/2005 | Wu et al. | 345/905 |
| 2006/0038745 A1 * | 2/2006 | Naksen et al. | 345/30 |
| 2006/0050169 A1 * | 3/2006 | Misawa | 348/333.06 |
| 2006/0209218 A1 * | 9/2006 | Lee et al. | 349/1 |
| 2007/0211036 A1 * | 9/2007 | Perkins | 345/173 |
| 2008/0151480 A1 * | 6/2008 | Chung et al. | 361/681 |
| 2008/0158795 A1 * | 7/2008 | Aoki et al. | 361/681 |
| 2008/0167095 A1 * | 7/2008 | Kim et al. | 455/575.3 |
| 2008/0247126 A1 * | 10/2008 | Otsuka et al. | 361/681 |
| 2010/0016038 A1 * | 1/2010 | Demuynck et al. | 455/575.3 |
| 2012/0002360 A1 * | 1/2012 | Seo et al. | 361/679.01 |
| 2012/0019482 A1 * | 1/2012 | Wang | 345/175 |
| 2012/0162876 A1 * | 6/2012 | Kim | 361/679.01 |
| 2012/0257368 A1 * | 10/2012 | Bohn et al. | 361/809 |
| 2012/0307423 A1 * | 12/2012 | Bohn et al. | 361/679.01 |

OTHER PUBLICATIONS

"First Office Action of China Counterpart Application" with English translation thereof, dated Dec. 2, 2016, p. 1-p. 14.

* cited by examiner

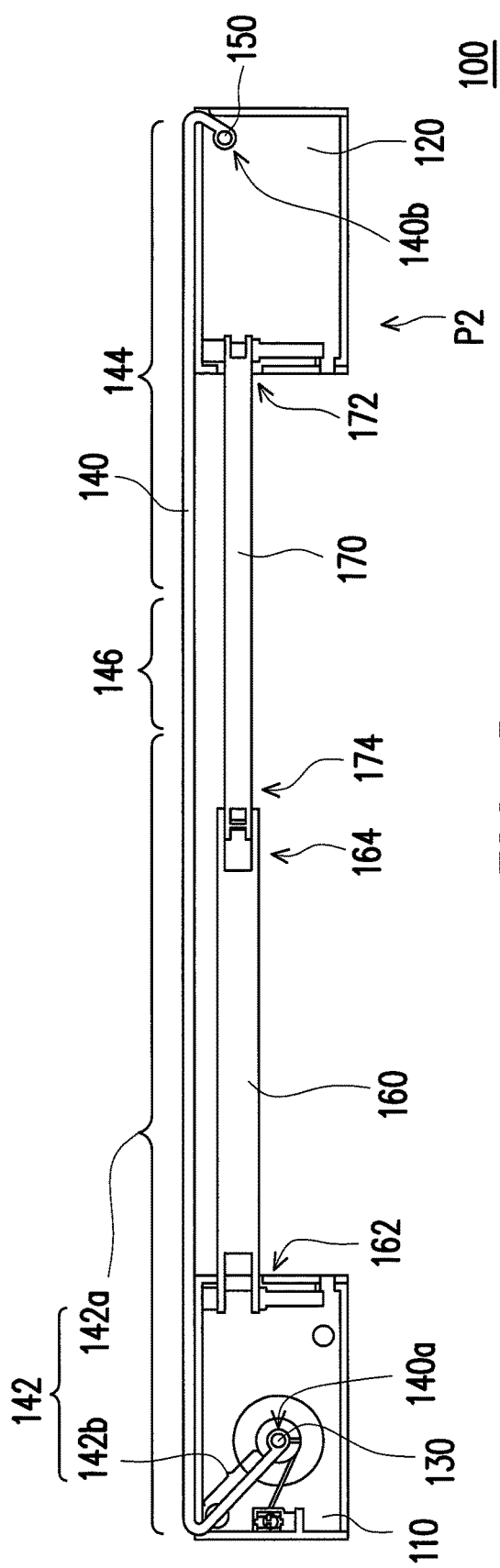
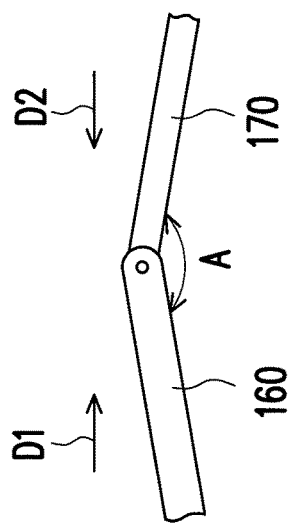
FIG. 5
FIG. 6

ELECTRONIC DEVICE

CROSS-REFERENCE TO RELATED APPLICATION

This application claims the priority benefit of Taiwan application serial no. 102138525, filed on Oct. 24, 2013. The entirety of the above-mentioned patent application is hereby incorporated by reference herein and made a part of this specification.

BACKGROUND

Technical Field

The invention relates to an electronic device, and more particularly, to an electronic device having a flexible display panel.

Background

Due to the progress of semiconductor devices and display apparatus technology, the development of the electronic devices is towards light weight, compact size, multiple functions and easy to carry. Common portable electronic devices include tablet PC, smart phone and notebook computer and so on.

With regard to smart phone and tablet PC, there are merely few functional differences between smart phone and tablet PC. More specifically, In order to provide user with a larger touch display screen, the dimensions of some smart phones are designed to be larger and larger, even close to those of tablet PCs. On the other hand, some table PCs are capable of inserting a Subscriber Identification Module card (SIM card) so as to provide communication function. However, no matter smart phones or tablet PCs, if smart phones or tablet PCs are designed as larger dimensions so as to provide users with larger touch display interfaces, those smart phones or tablet PCs are inconvenient to be carried. On the contrary, if smart phones or tablet PCs are designed as smaller dimensions so as to be carried easily, the sizes of the touch display interfaces are limited.

SUMMARY OF THE INVENTION

The invention is directed to an electronic device whose dimensions of the body and the display panel are adjustable based on user's demand.

An electronic device of the invention includes a first body, a second body, a rotary shaft and a flexible display panel. The second body is movably connected to the first body, wherein the second body is adapted to move to a first position so as to lean against the first body or move to a second position so as to separate from the first body. The rotary shaft is pivotally connected to the first body. The flexible display panel is connected between the rotary shaft and the second body. When the second body is at the first position, a first section of the flexible display panel is rolled around the rotary shaft, and a second section of the flexible display panel is expanded between the first body and the second body. When the second body is at the second position, a part of the first section and the second section are expanded between the first body and the second body.

In an embodiment of the invention, the electronic device further includes at least one first rod and at least one second rod, wherein an end of the first rod is pivotally connected to the first body, an end of the second rod is pivotally connected to the second body, the other end of the first rod is pivotally connected to the other end of the second rod, and the second body moves between the first position and the second position through rotations of the first rod and the second rod.

In an embodiment of the invention, wherein when the second body is at the second position, an included angle between the first rod and the second rod is less than 180 degree.

In an embodiment of the invention, wherein a thickness of the first body is equal to a thickness of the second body.

In an embodiment of the invention, the electronic device further includes a main board and a battery, wherein the main board is disposed in the first body, and the battery is disposed in the second body.

In an embodiment of the invention, wherein a thickness of the first body is larger than a thickness of the second body, the first body has a concave portion, and when the second body is at the first position, the second body leans against the concave portion.

In an embodiment of the invention, the electronic device further includes a main board and a battery, wherein the main board and the battery are disposed in the first body.

In an embodiment of the invention, the electronic device further includes a fixed shaft, wherein the fixed shaft is fixed to the second body, and the flexible display panel is connected between the rotary shaft and the fixed shaft.

In an embodiment of the invention, the electronic device further includes a first elastic member, wherein the first elastic member is connected between the rotary shaft and the first body, and tension of the flexible display panel is generated by elastic force of the first elastic member.

In an embodiment of the invention, the electronic device further includes a cable and a main board, wherein the main board is disposed in the first body, a first connecting end of the flexible display panel is connected to the rotary shaft, and the cable is connected between the first connecting end and the main board.

In an embodiment of the invention, the electronic device further includes a cable storage structure, wherein the cable storage structure includes a casing, a sliding member and a second elastic member. The casing is disposed in the first body. The sliding member is slidably disposed at the casing, wherein the cable passes through the sliding member, and when the second body is at the first position, the cable is extended in the casing partially. The second elastic member is connected between the casing and the sliding member, wherein when the second body is moved from the first position to the second position, the rotary shaft is rotated so that at least a part of the cable inside the casing is rolled around the rotary shaft, and the sliding member is pulled by the cable to slide along the casing by resisting elastic force of the second elastic member.

In an embodiment of the invention, wherein the sliding member has an extending portion, the extending portion has an opening, the second elastic member is connected to the opening of the extending portion, and the cable is disposed at the extending portion of the sliding member by passing through the opening of the extending portion.

In an embodiment of the invention, wherein the rotary shaft has a first groove and a second groove, the first groove is extended along an axial direction of the rotary shaft, the second groove is circular and connected to the first groove, and the cable is extended from the flexible display panel to the second groove along the first groove and rolled in the second groove partially.

In an embodiment of the invention, the electronic device further includes a cable and a main board, wherein the main board is disposed in the first body, a second connecting end of the flexible display panel is connected to the second body, and the cable is connected between the second connecting end and the main board.

In an embodiment of the invention, the electronic device further includes at least one first rod and at least one second rod, wherein an end of the first rod is pivotally connected to the first body, an end of the second rod is pivotally connected to the second body, the other end of the first rod is pivotally connected to the other end of the second rod, and the second body moves between the first position and the second position through rotations of the first rod and the second rod.

In an embodiment of the invention, the cable is extended from the second body to the first body along the first rod and the second rod so as to connect to the main board.

In an embodiment of the invention, wherein the first body has a first magnetic member, the second body has a second magnetic member, when the second body is at the first position, the first magnetic member is aligned with the second magnetic member, and the second body is fixed to the first body via a magnetic attractive force between the first magnetic member and the second magnetic member.

In an embodiment of the invention, wherein the first body has a first electromagnet, the second body has a second electromagnet, when the second body is at the first position, the first electromagnet is aligned with the second electromagnet, a magnetic repulsive force is adapted to be generated between the first electromagnet and the second electromagnet, and the second body moves to the second position by the magnetic repulsive force resisting the magnetic attractive force.

In summary, in the electronic device of the invention, the second body is movably connected to the first body, and the flexible display panel is connected between the second body and the rotary shaft on the first body, and is adapted to be partially rolled around the rotary shaft. Accordingly, the second body can be leant against the first body by user so as to reduce dimension of the electronic device, and the first section of the flexible display panel is rolled around the rotary shaft so that the electronic device is adjusted to a smart phone mode which is easy to carry. In addition, the second body can be separated from the first body by user so as to drive the first section of the flexible display panel to expand partially to increase a display area of the flexible display panel, so that the electronic device is adjusted to a tablet PC mode to provide larger touch display interface.

To make the above features and advantages of the disclosure more comprehensible, several embodiments accompanied with drawings are described in detail as follows.

BRIEF DESCRIPTION OF THE DRAWINGS

FIG. 5 is a partial cross-sectional schematic view of the electronic device depicted in FIG. 2.

FIG. 6 is a partial top schematic view of a first rod and a second rod depicted in FIG. 2.

DETAILED DESCRIPTION

Figure 1:
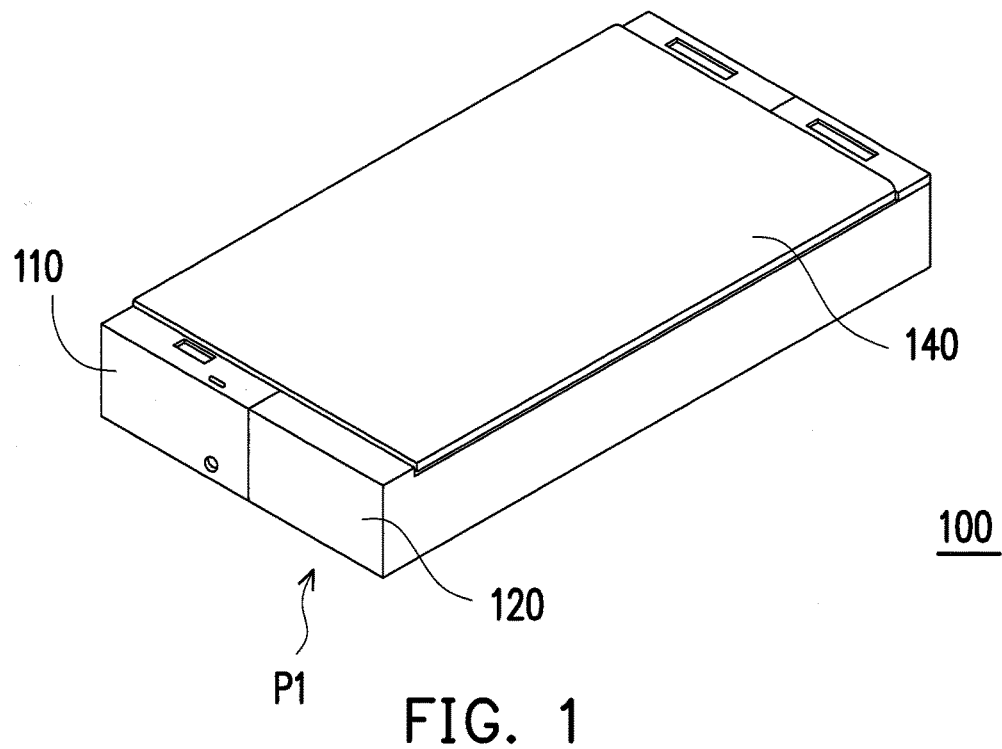
FIG. 1 is a stereoscopic schematic view of an electronic device according to one embodiment of the invention.
Figure 2:
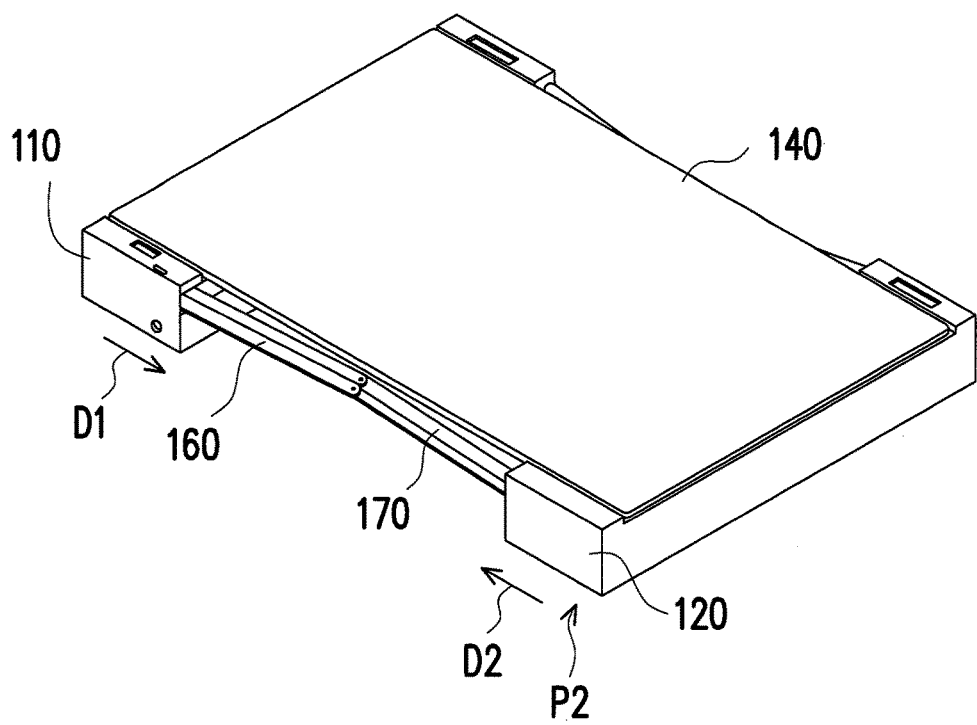
FIG. 2 is a stereoscopic schematic view of a second body separated from a first body depicted in FIG. 1.
Figure 3:
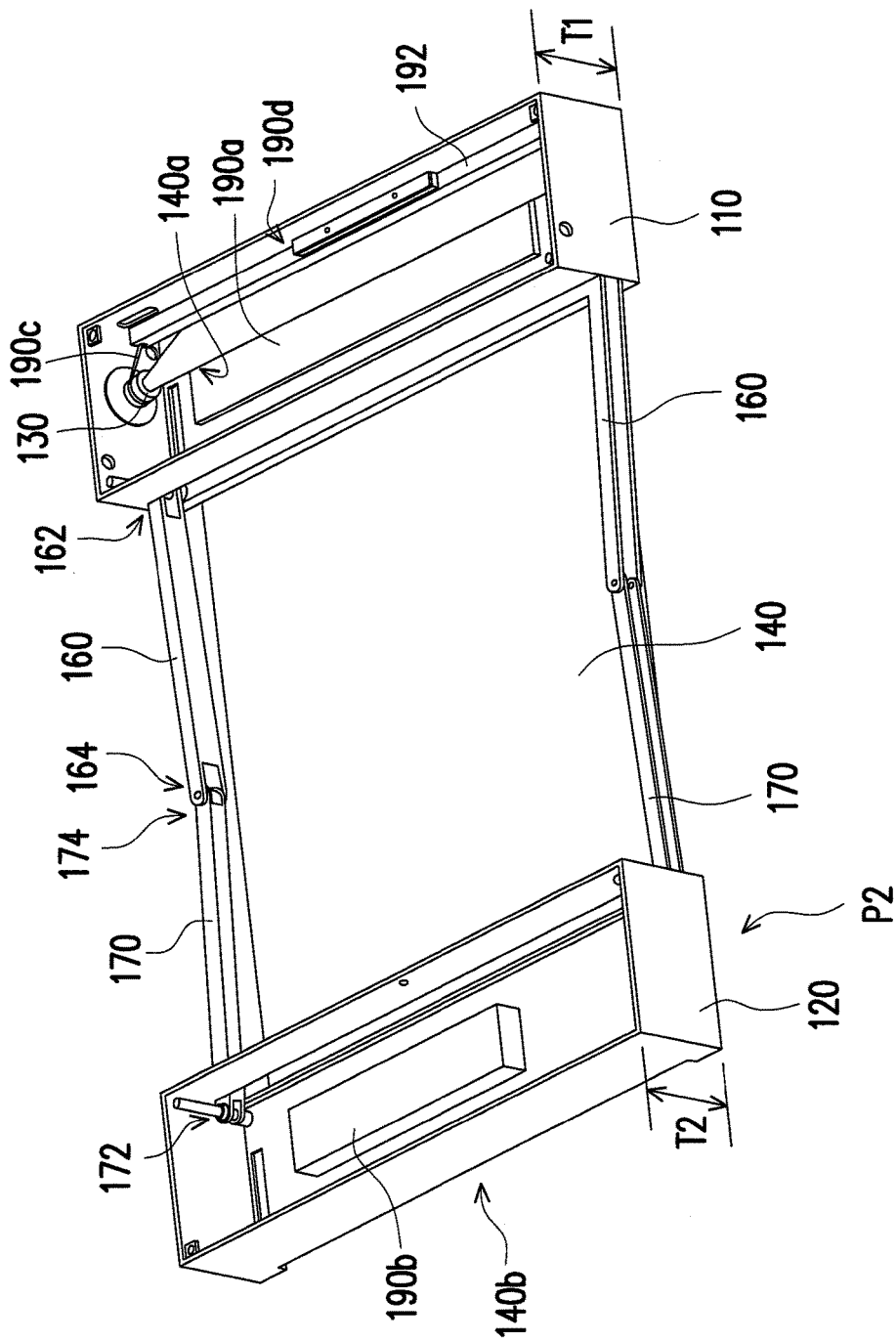
FIG. 3 is a partial stereoscopic schematic view from another perspective of the electronic device depicted in FIG. 2.

FIG. 1 is a stereoscopic schematic view of an electronic device according to one embodiment of the invention. FIG. 2 is a stereoscopic schematic view of a second body separated from a first body depicted in FIG. 1. FIG. 3 is a partial stereoscopic schematic view from another perspective of the electronic device depicted in FIG. 2. Referring to FIG. 1 to FIG. 3, an electronic device 100 of the present embodiment is, for example, a touch display device and includes a first body 110, a second body 120 and a flexible display panel 140. The flexible display panel 140 is, for example, a touch display panel. The second body 120 is movably connected to the first body 110. The second body 120 is adapted to move to a first position P1 as shown in FIG. 1 so as to lean against the first body 110 or move to a second position P2 as shown in FIG. 2 so as to separate from the first body 110. The expanded condition of the flexible display panel 140 varies with the movement of the second body 120.

Figure 4:
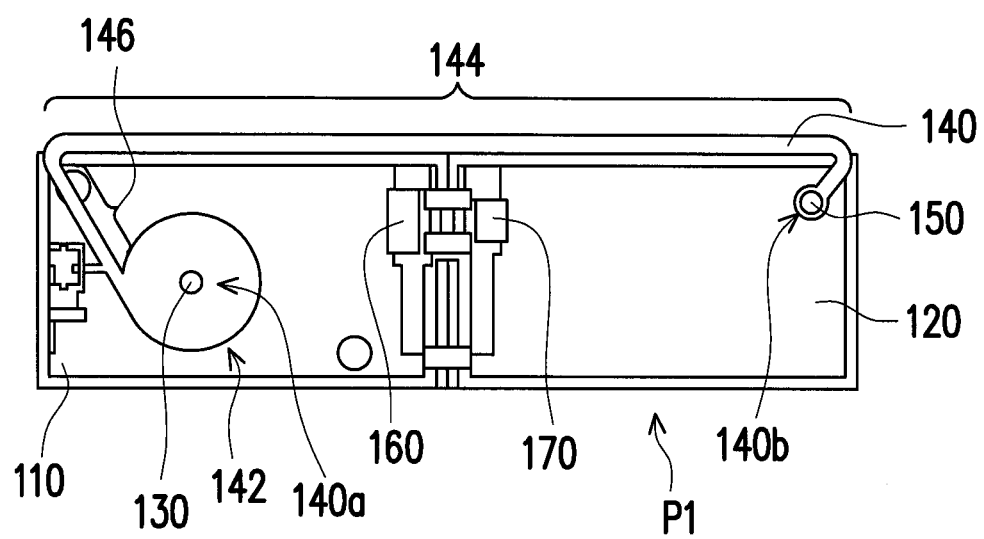
FIG. 4 is a partial cross-sectional schematic view of the electronic device depicted in FIG. 1.

FIG. 4 is a partial cross-sectional schematic view of the electronic device depicted in FIG. 1. FIG. 5 is a partial cross-sectional schematic view of the electronic device depicted in FIG. 2. Referring to FIG. 3 to FIG. 5, in detail, the electronic device 100 further includes a rotary shaft 130 and a fixed shaft 150. The rotary shaft 130 is pivotally connected to the first body 110, and the fixed shaft 150 is fixed to the second body 120. A first connecting end 140a of the flexible display panel 140 is connected to the rotary shaft 130 on the first body 110, and a second connecting end 140b of the flexible display panel 140 is connected to the fixed shaft 150 on the second body 120. When the second body 120 is at the first position P1 as shown in FIG. 4, a first section 142 of the flexible display panel 140 is rolled around the rotary shaft 130, a second section 144 of the flexible display panel 140 is expanded between the first body 110 and the second body 120, and a third section 146 of the flexible display panel 140 is connected between the first section 142 and the second section 144. When the second body 120 is at the second position P2 as shown in FIG. 5, a part 142a of the first section 142, the second section 144 and the third section 146 are expanded between the first body 110 and the second body 120, and the other part 142b of the first section 142 is connected between the part 142a of the first section 142 and the rotary shaft 130.

According to the above configuration, user can adjust the position of the second body 120 as shown in FIG. 1 and FIG.

4, so that the second body 120 leans against the first body 110 to reduce the dimension of the electronic device 100, the first section 142 of the flexible display panel 140 is rolled around the rotary shaft 130, and the electronic device 100 is adjusted to a smart phone mode which is easy to carry. In addition, user can adjust the position of the second body 120 as shown in FIG. 2, FIG. 3 and FIG. 5, so that the second body 120 can separate from the first body 110 so as to drive the first section 142 of the flexible display panel 140 to expand partially to increase a display area of the flexible display panel 140, so that the electronic device 100 is adjusted as a tablet PC mode to provide larger touch display interface.

In the present embodiment, the electronic device 100 further includes at least one first rod 160 (two first rods 160 are shown in FIG. 3) and at least one second rod 170 (two second rods 170 are shown in FIG. 3), and the second body 120 is movably connected to the first body 110 via the first rods 160 and the second rods 170. More specifically, an end 162 of the first rod 160 is pivotally connected to the first body 110, an end 172 of the second rod 170 is pivotally connected to the second body 120, and the other end 164 of the first rod 160 is pivotally connected to the other end 174 of the second rod 170. The second body 120 is adapted to move between the first position P1 and the second position P2 through rotations of the first rods 160 and the second rods 170. In the present embodiment, the first rods 160 and the second rods 170, for example, have a positioning bump and a positioning recess, respectively. When the second body 120 is at the second position P2, the second body 120 is fixed by collocation of the positioning bump and the positioning recess.

FIG. 6 is a partial top schematic view of a first rod and a second rod depicted in FIG. 2. In the present embodiment, when the second body 120 is at the second position P2 and separates from the first body 110 as shown in FIG. 2, the first rod 160 and the second rod 170 expand relatively, and an included angle A between the first rod 160 and the second rod 170 is slightly less than 180 degree as shown in FIG. 6. Accordingly, when user respectively applies forces to the first body 110 along a first direction D1 and to the second body 120 along a second direction D2 so as to approach the first body 110 and the second body 120, the condition that the first rod 160 and the second rod 170 cannot be retracted swimmingly by the forces along the first direction D1 and the second direction D2 while an included angle between the first rod 160 and the second rod 170 is equal to 180 degree can be prevented.

Figure 7:
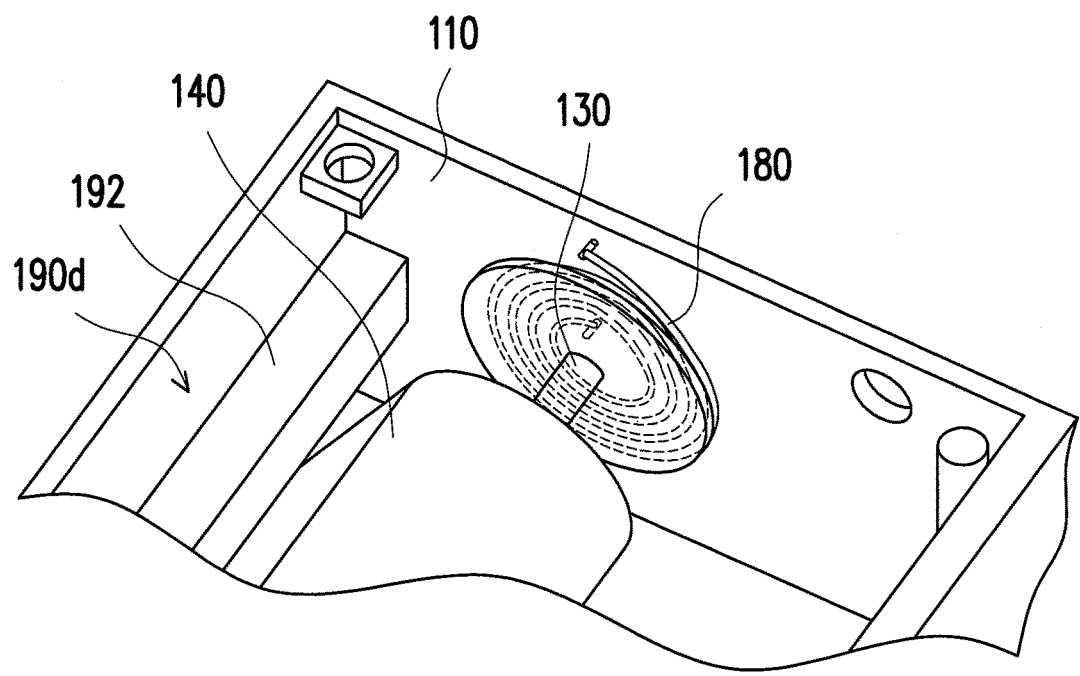
FIG. 7 is a partial stereoscopic schematic view of the electronic device depicted in FIG. 1.

FIG. 7 is a partial stereoscopic schematic view of the electronic device depicted in FIG. 1. Referring to FIG. 7, the electronic device 100 (labeled in FIG. 1) of the present embodiment further includes a first elastic member 180. The first elastic member 180 is, for example, a torsion spring and connected between the rotary shaft 130 and the first body 110. When the flexible display panel 140 is expanded partially between the first body 110 and the second body 120 as shown in FIG. 1 or FIG. 2, tension of the flexible display panel 140 is generated by elastic force of the first elastic member 180, so that a display surface of the flexible display panel 140 can be even. When the second body 120 is moved from the second position P2 shown in FIG. 2 to the first position P1 shown in FIG. 1 so as to lean against the first body 110, the first section 142 (labeled in FIG. 4) of the flexible display panel 140 is rolled around the rotary shaft 130 by the elastic force of the first elastic member 180.

Referring to FIG. 3, in the present embodiment, the electronic device 100 further includes a main board 190a and a battery 190b, a thickness T1 of the first body 110 is equal to a thickness T2 of the second body 120, and the main board 190a and the battery 190b are disposed in the first body 110 and the second body 120, respectively. The electronic device 100 further includes a cable 190c, the cable 190c is connected between the first connecting end 140a of the flexible display panel 140 and the main board 190a so that the flexible display panel 140 and the main board 190a can transmit signal to each other via the cable 190c. In addition, a cable (not shown) of the battery 190b is, for example, extended from the second body 120 to the first body 110 along the second rod 170 and the first rod 160 so as to connect to the main board 190a.

Figure 8:
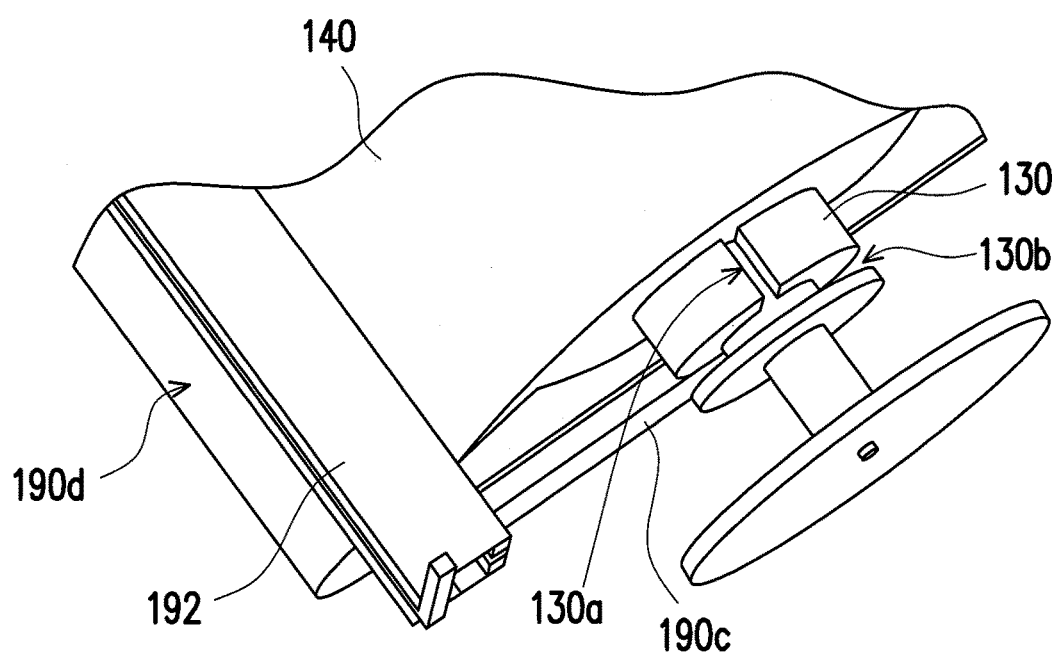
FIG. 8 is a partial stereoscopic schematic view of the electronic device depicted in FIG. 1.
Figure 9A:
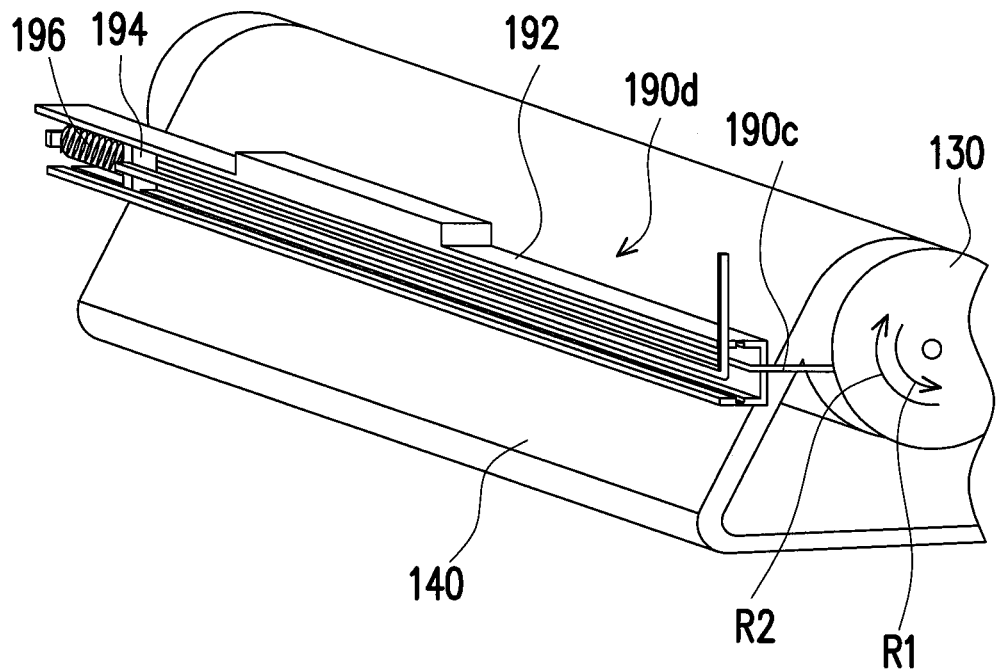
FIG. 9A is a partial stereoscopic schematic view of the electronic device depicted in FIG. 1.
Figure 9B:
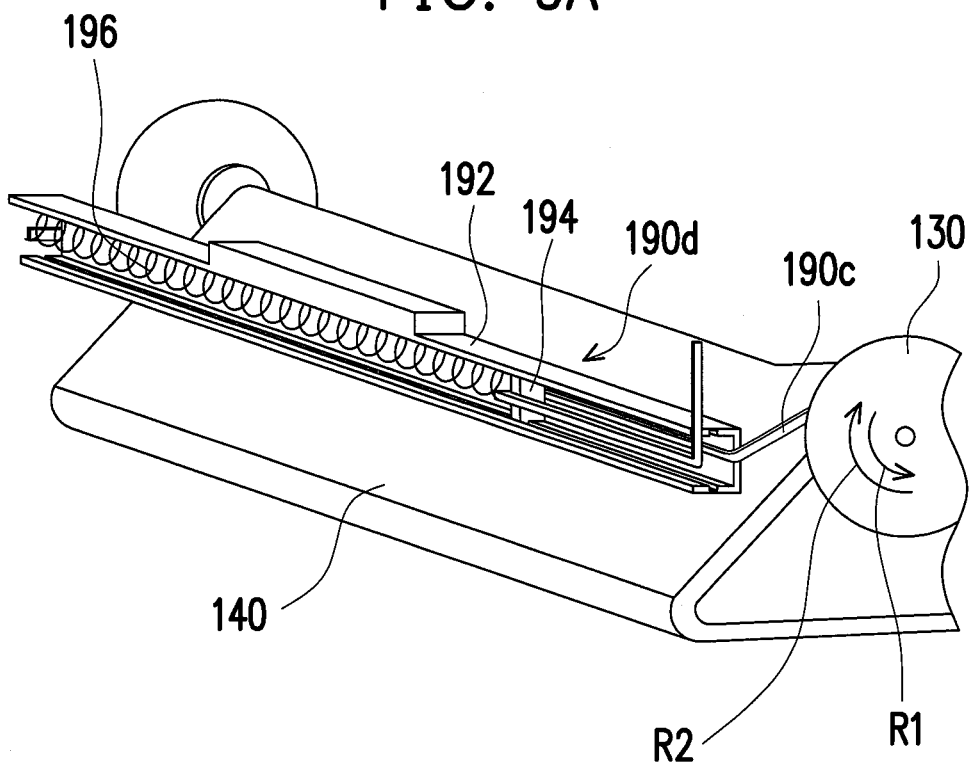
FIG. 9B is a stereoscopic schematic view of operation of a cable storage structure depicted in FIG. 9A.
Figure 10:
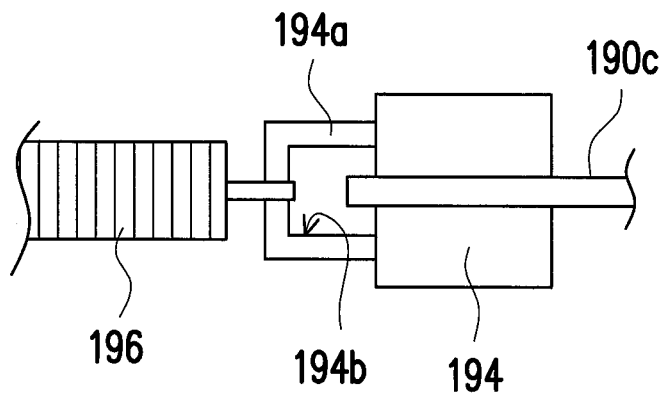
FIG. 10 is a partial enlarged schematic view of a sliding member, a cable and a second elastic member depicted in FIG. 9A.

The configuration of the cable 190c inside the first body 110 is illustrated by the following drawings detailedly. FIG. 8 is a partial stereoscopic schematic view of the electronic device depicted in FIG. 1. FIG. 9A is a partial stereoscopic schematic view of the electronic device depicted in FIG. 1. FIG. 9B is a stereoscopic schematic view of operation of a cable storage structure depicted in FIG. 9A. Referring FIG. 3, FIG. 8 and FIG. 9A, the electronic device 100 (labeled in FIG. 1) of the present embodiment further includes a cable storage structure 190d, the cable storage structure 190d includes a casing 192, a sliding member 194 and a second elastic member 196. The casing 192 is disposed in the first body 110, the sliding member 194 is slidably disposed at the casing 192, the cable 190c passes through the sliding member 194, and the second elastic member 196 is, for example, a tension spring and connected between the casing 192 and the sliding member 194. When the second body 120 is at the first position P1 as shown in FIG. 1 and FIG. 4, the cable 190c is extended in the casing 192 partially. When the second body 120 is moved from the first position P1 to the second position P2 as shown in FIG. 2, FIG. 3 and FIG. 5, the flexible display panel 140 is forced to expand and to resist the elastic force of the first elastic member 180 (shown in FIG. 7) so as to drive the rotary shaft 130 to rotate along a rotating direction R1. At the moment, at least a part of the cable 190c inside the casing 192 shown in FIG. 9 is rolled around the rotary shaft 130 with the rotation of the rotary shaft 130, and the cable 190c pulls the sliding member 192 as shown in FIG. 10 so that the sliding member 192 slides along the casing 192 by resisting elastic force of the second elastic member 196. When the second body 120 is moved from the above second position P2 to the above first position P1, the rotary shaft 130 is rotated along a rotating direction R2 by the elastic force of the first elastic member 180 (shown in FIG. 7), and the sliding member 194 and the cable 190c return to the condition shown in FIG. 9 by the elastic force of the second elastic member 196.

FIG. 10 is a partial enlarged schematic view of a sliding member, a cable and a second elastic member depicted in FIG. 9A. Referring to FIG. 10, the sliding member 194 of the present embodiment has an extending portion 194a, and the extending portion 194a has an opening 194b. The second elastic member 196 is connected to the opening 194b of the extending portion 194a, and the cable 190c is disposed at the extending portion 194a of the sliding member 194 by passing through the opening 194b of the extending portion 194a. In another embodiment, the second elastic member 196 may be connected to the sliding member 194 by another proper manner, the cable 190c may pass through the sliding member 194 by another proper manner, and the invention is not limited thereto.

Referring to FIG. 8, in the present embodiment, the rotary shaft 130 has a first groove 130a and a second groove 130b, the first groove 130a is extended along an axial direction of the rotary shaft 130, the second groove 130b is circular and connected to the first groove 130a. The cable 190c is extended from the flexible display panel 140 to the second groove 130b along the first groove 130a, and rolled in the second groove 130b partially. Therefore, the position of a part of the cable 190c can be limited in the first groove 130a and the second groove 130b to prevent the cable 190c from moving unexpectedly.

In another embodiment, the cable 190c may be extended and connected between the second connecting end 140b (labeled in FIG. 3 to FIG. 5) of the flexible display panel 140 and the main board 190a along the first rod 160 and the second rod 170. In this way, it does not need the cable storage structure 190d and the rotary shaft 130 shown in FIG. 8 to FIG. 10 to collect the cable 190c.

Figure 11:
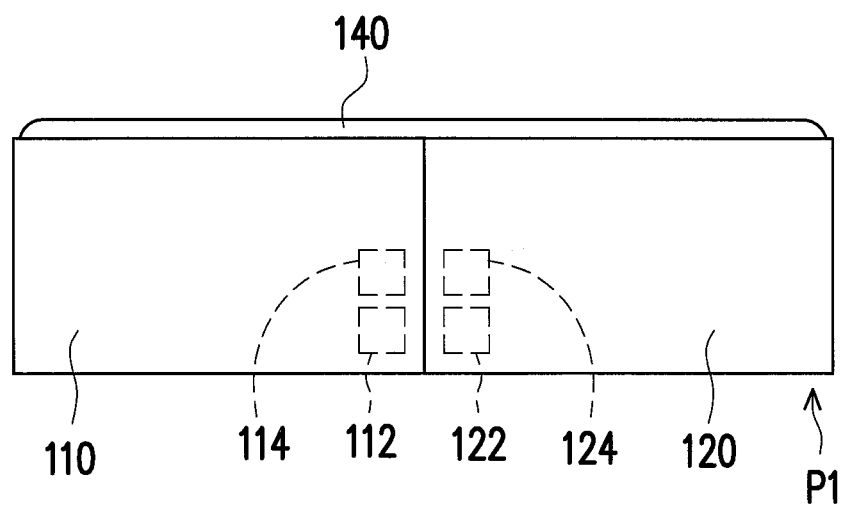
FIG. 11 is a side schematic view of the electronic device depicted in FIG. 1.
Figure 12:
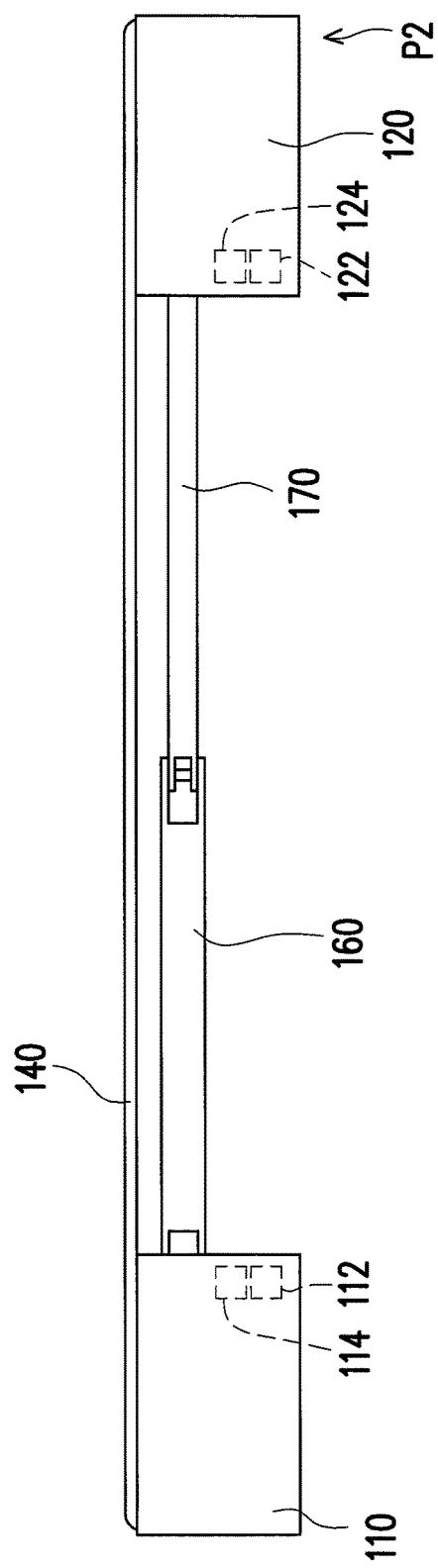
FIG. 12 is a side schematic view of the electronic device depicted in FIG. 2.

FIG. 11 is a side schematic view of the electronic device depicted in FIG. 1. FIG. 12 is a side schematic view of the electronic device depicted in FIG. 2. Referring to FIG. 11 and FIG. 12, the first body 110 of the present embodiment has a first magnetic member 112, the second body 120 has a second magnetic member 122, and the first magnetic member 112 and the second magnetic member 122 are, for instance, permanent magnets. When the second body 120 is at the first position P1 as shown in FIG. 11, the first magnetic member 112 is aligned with the second magnetic member 122, and the second body 120 is fixed to the first body 110 via a magnetic attractive force between the first magnetic member 112 and the second magnetic member 122 so as to prevent the first body 110 separating from the second body 120 unexpectedly. In addition, the first body 110 further has a first electromagnet 114, and the second body 120 further has a second electromagnet 124. When the second body 120 is at the first position P1, the first electromagnet 114 is aligned with the second electromagnet 124. While user would like to separate the second body 120 from the first body 110, he/she could input a signal to drive the first electromagnet 114 and the second electromagnet 124 to generate a magnetic repulsive force by touching the electronic device 100, pressing a physical button of the electronic device 100 or another proper input manner, so that the second body 120 moves to the second position P2 by the magnetic repulsive force which resists the magnetic attractive force between the first magnetic member 112 and the second magnetic member 122.

Figure 13:
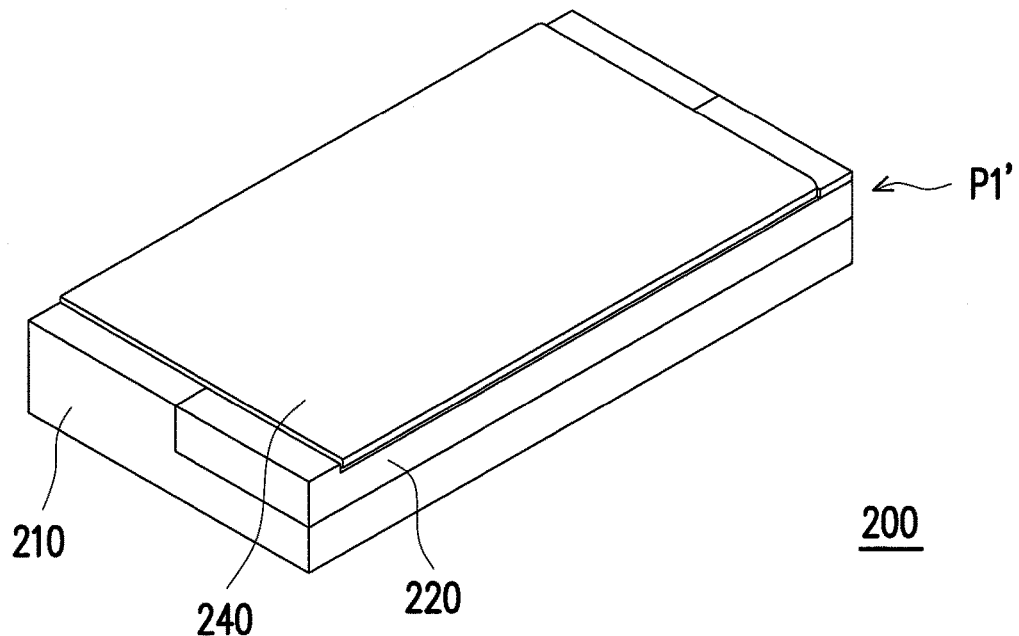
FIG. 13 is a stereoscopic schematic view of an electronic device according to another embodiment of the invention.
Figure 14:
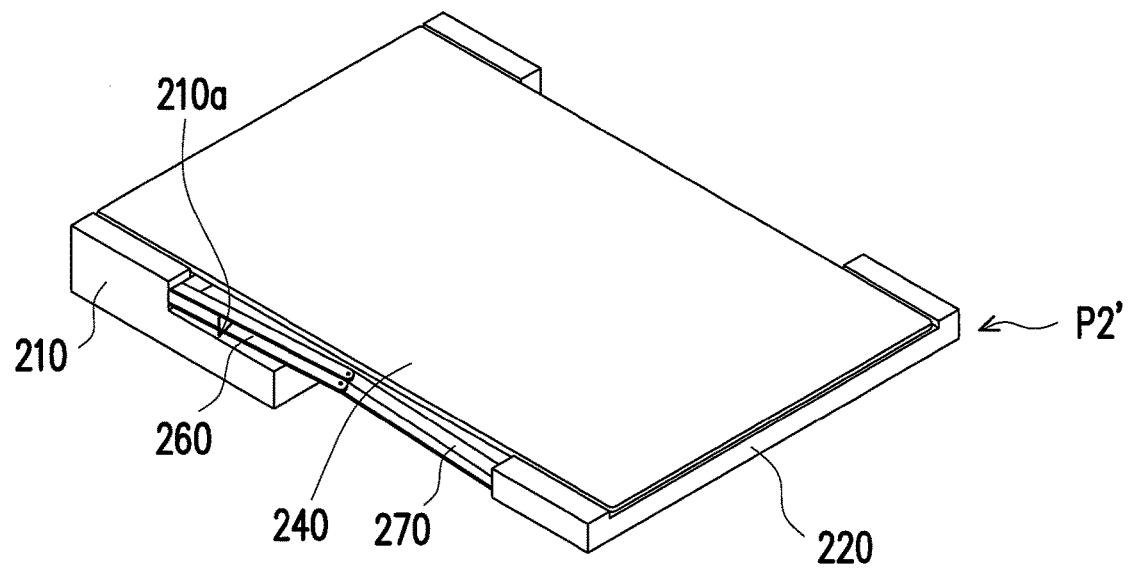
FIG. 14 is a stereoscopic schematic view of a second body separated from a first body depicted in FIG. 13.
Figure 15:
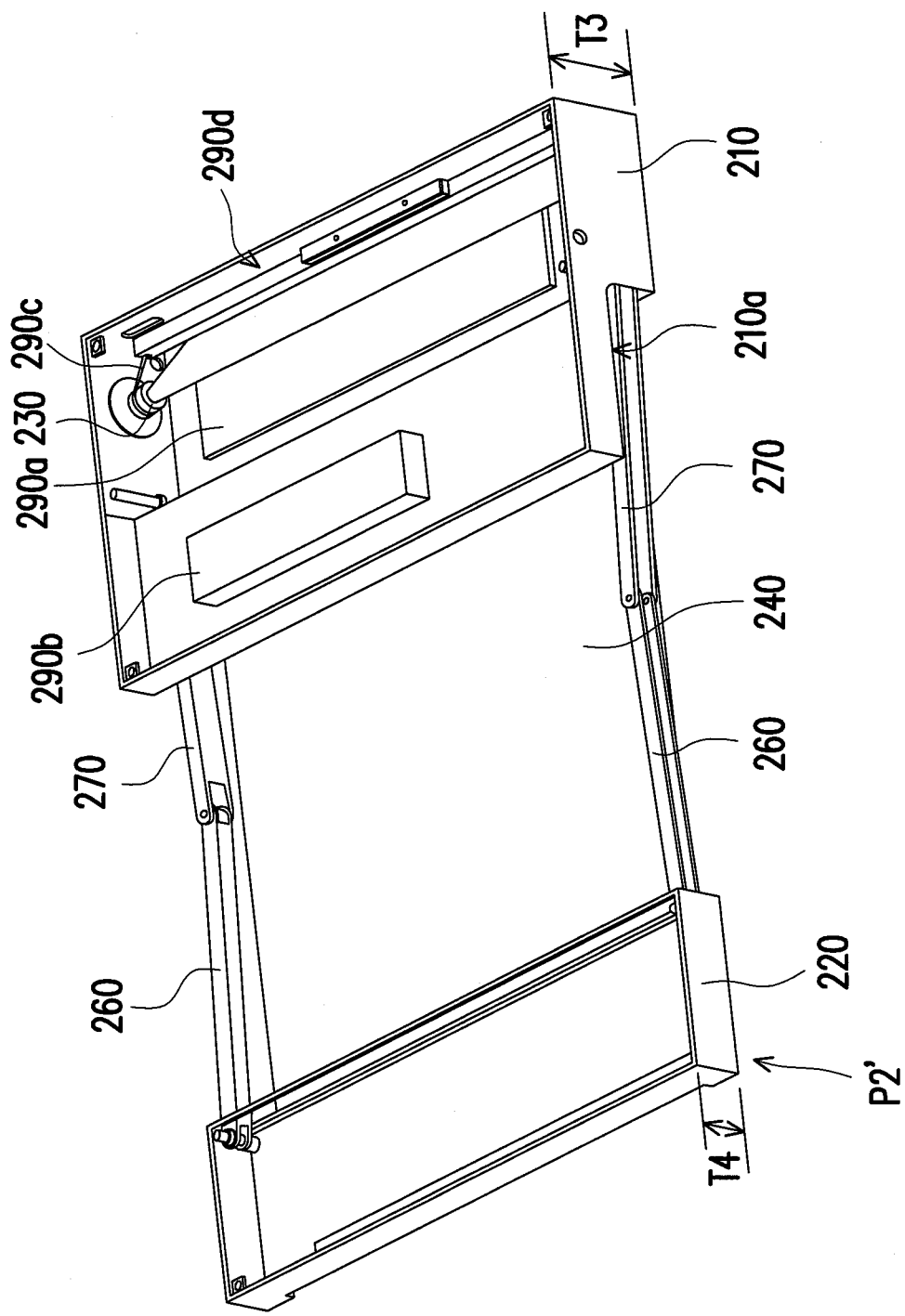
FIG. 15 is a partial stereoscopic schematic view from another perspective of the electronic device depicted in FIG. 13.

FIG. 13 is a stereoscopic schematic view of an electronic device according to another embodiment of the invention. FIG. 14 is a stereoscopic schematic view of a second body separated from a first body depicted in FIG. 13. FIG. 15 is a partial stereoscopic schematic view from another perspective of the electronic device depicted in FIG. 13. In an electronic device 200 of FIG. 13 to FIG. 15, the configuration and the operation of a first body 210, a second body 220, a rotary shaft 230, a flexible display panel 240, a first rod 260, a second rod 270, a main board 290a, a cable 290c and a cable storage structure 290d are similar to those of the first body 110, the second body 120, the rotary shaft 130, the flexible display panel 140, the first rod 160, the second rod 170, the main board 190a, the cable 190c and the cable storage structure 190d shown in FIG. 1 to FIG. 3. The second body 220 is adapted to move between a first position P1' shown in FIG. 13 and a second position P2' shown in FIG. 14 and FIG. 15, as well as the second body 120 is adapted to move between the first position P1 shown in FIG. 1 and the second position P2 shown in FIG. 2 and FIG. 3, a relevant description thereof is not repeated herein. A difference between the electronic device 200 and the electronic device 100 is that a thickness T3 of the first body 210 is larger than a thickness T4 of the second body 220. The first body 210 has a concave portion 210a, when the second body 220 is at the first position P1' shown in FIG. 13, the second body 220 leans against the concave portion 210a. Because the thickness T3 of the first body 210 of the present embodiment is larger than the thickness T4 of the second body 220, the second body 220 has smaller volume. The main board 290a and the battery 290b can be disposed in the first body 210 as shown in FIG. 15.

In summary, in the electronic device of the invention, the second body is movably connected to the first body, and the flexible display panel is connected between the second body and the rotary shaft on the first body and is adapted to be partially rolled around the rotary shaft. Accordingly, the second body can be leant against the first body by user so as to reduce dimension of the electronic device, and the first section of the flexible display panel is rolled around the rotary shaft so that the electronic device is adjusted to a smart phone mode which is easy to carry. In addition, the second body can be separated from the first body by user so as to drive the first section of the flexible display panel to expand partially to increase a display area of the flexible display panel, so that the electronic device is adjusted to a tablet PC mode to provide larger touch display interface.

What is claimed is:

1. An electronic device, comprising:
   a first body;
   a second body, movably connected to the first body, wherein the second body is adapted to move to a first position so as to lean against the first body or move to a second position so as to separate from the first body;
   a rotary shaft, pivotally connected to the first body;
   a fixed shaft, wherein the fixed shaft is fixed to the second body;
   a flexible display panel, connected between the rotary shaft and the fixed shaft, wherein when the second body is at the first position, a first section of the flexible display panel is rolled around the rotary shaft, and a second section of the flexible display panel is expanded between the first body and the second body, and the second section of the flexible display panel is located outside the first body and the second body, and
   at least one first rod and at least one second rod, wherein an end of the first rod is pivotally connected to the first body, an end of the second rod is pivotally connected to the second body, the other end of the first rod is pivotally connected to the other end of the second rod, and the second body moves between the first position and the second position through rotations of the first rod and the second rod,
   when the second body is at the second position, a part of the first section and the second section are expanded between the first body and the second body.

2. The electronic device of claim 1, wherein when the second body is at the second position, an included angle between the first rod and the second rod is less than 180 degree.

3. The electronic device of claim 1, wherein a thickness of the first body is equal to a thickness of the second body.

4. The electronic device of claim 3, further comprising a main board and a battery, wherein the main board is disposed in the first body, and the battery is disposed in the second body.

5. The electronic device of claim 1, wherein a thickness of the first body is larger than a thickness of the second body, the first body has a concave portion, and when the second body is at the first position, the second body leans against the concave portion.

6. The electronic device of claim 5, further comprising a main board and a battery, wherein the main board and the battery are disposed in the first body.

7. The electronic device of claim 1, further comprising a first elastic member, wherein the first elastic member is connected between the rotary shaft and the first body, and tension of the flexible display panel is generated by elastic force of the first elastic member.

8. The electronic device of claim 1, further comprising a cable and a main board, wherein the main board is disposed in the first body, a first connecting end of the flexible display panel is connected to the rotary shaft, and the cable is connected between the first connecting end and the main board.

9. The electronic device of claim 8, further comprising a cable storage structure, wherein the cable storage structure comprises:
 a casing, disposed in the first body;
 a sliding member, slidably disposed at the casing, wherein the cable passes through the sliding member, and when the second body is at the first position, the cable is extended in the casing partially; and
 a second elastic member, connected between the casing and the sliding member, wherein when the second body is moved from the first position to the second position, the rotary shaft is rotated so that at least a part of the cable inside the casing is rolled around the rotary shaft, and the sliding member is pulled by the cable to slide along the casing by resisting elastic force of the second elastic member.

10. The electronic device of claim 9, wherein the sliding member has an extending portion, the extending portion has an opening, the second elastic member is connected to the opening of the extending portion, and the cable is disposed at the extending portion of the sliding member by passing through the opening of the extending portion.

11. The electronic device of claim 8, wherein the rotary shaft has a first groove and a second groove, the first groove is extended along an axial direction of the rotary shaft, the second groove is circular and connected to the first groove, and the cable is extended from the flexible display panel to the second groove along the first groove and rolled in the second groove partially.

12. The electronic device of claim 1, further comprising a cable and a main board, wherein the main board is disposed in the first body, a second connecting end of the flexible display panel is connected to the second body, and the cable is connected between the second connecting end and the main board.

13. The electronic device of claim 12, further comprising at least one first rod and at least one second rod, wherein an end of the first rod is pivotally connected to the first body, an end of the second rod is pivotally connected to the second body, the other end of the first rod is pivotally connected to the other end of the second rod, and the second body moves between the first position and the second position through rotations of the first rod and the second rod.

14. The electronic device of claim 13, the cable is extended from the second body to the first body along the first rod and the second rod so as to connect to the main board.

15. The electronic device of claim 1, wherein the first body has a first magnetic member, the second body has a second magnetic member, when the second body is at the first position, the first magnetic member is aligned with the second magnetic member, and the second body is fixed to the first body via a magnetic attractive force between the first magnetic member and the second magnetic member.

16. The electronic device of claim 15, wherein the first body has a first electromagnet, the second body has a second electromagnet, when the second body is at the first position, the first electromagnet is aligned with the second electromagnet, a magnetic repulsive force is adapted to be generated between the first electromagnet and the second electromagnet, and the second body moves to the second position by the magnetic repulsive force resisting the magnetic attractive force.

* * * * *